United States Patent
Sato et al.

(10) Patent No.: US 8,967,121 B2
(45) Date of Patent: Mar. 3, 2015

(54) INTERNAL COMBUSTION ENGINE CONTROL APPARATUS AND CONTROL METHOD FOR INTERNAL COMBUSTION ENGINE CONTROL APPARATUS

(75) Inventors: Akira Sato, Gotenba (JP); Yasuyuki Irisawa, Susono (JP); Sinichi Mitani, Susono (JP); Takashi Tsunooka, Gotenba (JP); Shigeyuki Urano, Susono (JP); Satoshi Yoshizaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 788 days.

(21) Appl. No.: 13/160,178

(22) Filed: Jun. 14, 2011

(65) Prior Publication Data
US 2011/0308501 A1 Dec. 22, 2011

(30) Foreign Application Priority Data

Jun. 17, 2010 (JP) .................. 2010-138413

(51) Int. Cl.
*F02M 33/04* (2006.01)
*F02D 19/06* (2006.01)
(Continued)

(52) U.S. Cl.
CPC ........ *F02D 19/0665* (2013.01); *F02D 19/0628* (2013.01); *F02D 19/0636* (2013.01); *F02D 19/0655* (2013.01); *F02M 31/186* (2013.01);
(Continued)

(58) Field of Classification Search
CPC .............. F02D 41/003; F02D 41/0035; F02D 19/0626; F02D 19/0628; F02D 19/0665; F02M 31/18; F02M 31/183; F02M 31/186

USPC ........... 123/179.16, 255, 516, 520, 543, 549, 123/557, 575, 576; 701/113
See application file for complete search history.

(56) References Cited

U.S. PATENT DOCUMENTS 6,189,516 B1 * 2/2001 Hei Ma ................... 123/524
6,234,156 B1 * 5/2001 Muto ...................... 123/698
(Continued)

FOREIGN PATENT DOCUMENTS

JP 06159155 A 6/1994
JP 07166978 A 6/1995
(Continued)

*Primary Examiner* — Thomas Moulis
*Assistant Examiner* — Elizabeth Hadley
(74) *Attorney, Agent, or Firm* — Gifford, Krass, Sprinkle, Anderson & Citkowski, P.C.

(57) ABSTRACT

In a control of an internal combustion engine control apparatus, the control apparatus includes: a fuel tank that stores a fuel; a vaporized fuel tank that is connected to an intermediate portion of an intake passageway of an internal combustion engine and that stores a vaporized fuel that is formed by vaporization of the fuel; an in-tank fuel supply device that supplies the fuel from the fuel tank into the vaporized fuel tank; and a normally-closed vaporized fuel supply valve that opens and closes a connecting portion between the vaporized fuel tank and the intake passageway. The control apparatus estimates air/fuel ratio in the vaporized fuel tank, and produces the vaporized fuel in the vaporized fuel tank by driving the in-tank fuel supply device, with the vaporized fuel supply valve closed, until the estimated air/fuel ratio becomes substantially zero, during operation of the engine. At the time of starting the engine, the control apparatus supplies the vaporized fuel stored in the vaporized fuel tank into the intake passageway by opening the vaporized fuel supply valve.

14 Claims, 6 Drawing Sheets

(51) Int. Cl.
 *F02M 31/18* (2006.01)
 *F02D 41/00* (2006.01)

(52) U.S. Cl.
 CPC .......... *F02D 19/0605* (2013.01); *F02D 41/003* (2013.01); *Y02T 10/36* (2013.01); *Y02T 10/126* (2013.01)
 USPC .......................................... 123/520; 123/557

(56) References Cited

U.S. PATENT DOCUMENTS

| | | | |
|---|---|---|---|
| 8,006,671 B2 * | 8/2011 | Maeda et al. | 123/491 |
| 8,271,183 B2 * | 9/2012 | Uhrich et al. | 701/113 |
| 8,347,864 B2 * | 1/2013 | Mai et al. | 123/520 |
| 8,393,313 B2 * | 3/2013 | Sato et al. | 123/557 |
| 8,412,438 B2 * | 4/2013 | Carter | 701/103 |
| 2002/0124836 A1 * | 9/2002 | Reddy | 123/518 |
| 2005/0005918 A1 * | 1/2005 | Newhouse et al. | 123/549 |
| 2007/0137601 A1 * | 6/2007 | Stanglmaier | 123/179.16 |
| 2011/0247593 A1 * | 10/2011 | Yoshizaki et al. | 123/520 |
| 2013/0013173 A1 * | 1/2013 | Tsunooka et al. | 701/104 |

FOREIGN PATENT DOCUMENTS

| | | | |
|---|---|---|---|
| JP | 0893530 A | | 4/1996 |
| JP | 2007-107442 A | | 4/2007 |
| JP | 2007224878 A | | 9/2007 |
| JP | 2007239523 A | * | 9/2007 |
| JP | 2008-151029 A | | 7/2008 |
| JP | 2009-275522 A | | 11/2009 |

\* cited by examiner

INTERNAL COMBUSTION ENGINE CONTROL APPARATUS AND CONTROL METHOD FOR INTERNAL COMBUSTION ENGINE CONTROL APPARATUS

CROSS-REFERENCE TO RELATED APPLICATIONS

This application claims priority to Japanese Patent Application No. 2010-138413 filed on Jun. 17, 2010, which is incorporated herein by reference in its entirety including the specification, drawings and abstract.

BACKGROUND OF THE INVENTION

1. Field of the Invention

The invention relates to a control apparatus for an internal combustion engine that uses a low-volatility fuel, for example, alcohol fuel, and relates to a control method for the internal combustion engine control apparatus.

2. Description of Related Art

As a related-art technology, there is known a control apparatus for an internal combustion engine that uses alcohol fuel as disclosed in, for example, Japanese Patent Application Publication No. 2007-224878 (JP-A-2007-224878). Since the alcohol fuel less readily vaporizes particularly at low temperature, the related-art internal combustion engine is provided with a vaporization chamber for vaporizing the fuel at the time of starting the engine. This vaporization chamber has a sealed structure that is isolated from the outside, and is connected to an intake passageway via a throttle passageway. Besides, the vaporization chamber is provided with an engine-start fuel injection valve that injects fuel into the vaporization chamber, and with a heater for heating the injected fuel.

To start the internal combustion engine, the heater is firstly activated at the time point at which a start signal is output to the internal combustion engine. After that, at the time point of elapse of an appropriate amount of time, the fuel is injected from the engine-start fuel injection valve into the vaporization chamber. When the fuel is injected, the vaporization chamber enters a reduced-pressure state due to intake negative pressure caused by cranking. As a result, the injected fuel vaporizes by receiving heat from the heater within the vaporization chamber under reduced pressure, and is supplied to each cylinder through the intake passageway. Thus, the related-art technology is intended to secure good engine startability during a cold start state or the like by vaporizing the fuel in the vaporization chamber at the time of starting the engine.

In the foregoing related-art technology, at the time of starting the engine, the heater is activated before the fuel is injected into the vaporization chamber to produce vaporized fuel. However, in this technology, after the engine start signal is output to the internal combustion engine, the heating of the heater and the heating of the injected fuel as well as the pressure reduction of the vaporization chamber are performed, so that the vaporized fuel is produced. Therefore, in the related-art technology, the production of the vaporized fuel at the time of start of the engine may require time, and it may not be possible to promptly supply the vaporized fuel into the cylinders.

Besides, the related-art technology does not have a construction for accurately grasping the air/fuel ratio in the vaporization chamber. Therefore, depending on the concentration of the vaporized fuel supplied to the engine at the time of start thereof, the air/fuel ratio at the time of start may be deviated to a lean side or a rich side, leading to a concern about deterioration of engine startability and deterioration of emission quality.

SUMMARY OF THE INVENTION

This invention provides a control apparatus for an internal combustion engine that supplies vaporized fuel into a cylinder when the fuel does not readily vaporize, for example, during a cold engine start or the like, and provides a control method for a control apparatus for an internal combustion engine that supplies vaporized fuel into a cylinder when the fuel does not readily vaporize, for example, during a cold engine start or the like, the control apparatus and the control method being capable of restraining deviation in the air-fuel ratio at the time of supply of the vaporized fuel and therefore improving engine startability and emission quality.

A first aspect of the invention relates to an internal combustion engine control apparatus. This control apparatus includes: a fuel tank that stores a fuel; a vaporized fuel tank that is connected to an intermediate portion of an intake passageway of an internal combustion engine and that stores a vaporized fuel that is formed by vaporization of the fuel; an in-tank fuel supply device that supplies the fuel from the fuel tank into the vaporized fuel tank; a normally-closed vaporized fuel supply valve that opens and closes a connecting portion between the vaporized fuel tank and the intake passageway; a vaporized fuel production device that drives the in-tank fuel supply device while the vaporized fuel supply valve is closed during operation of the internal combustion engine, and that therefore produces the vaporized fuel in the vaporized fuel tank; an estimation device that estimates air/fuel ratio in the vaporized fuel tank; a production control device that executes production of the vaporized fuel by the vaporized fuel production device until the air/fuel ratio in the vaporized fuel tank estimated by the estimation device becomes substantially zero; and a supply control device that opens the vaporized fuel supply valve at a time of starting the internal combustion engine, and therefore supplies the vaporized fuel stored in the vaporized fuel tank into the intake passageway.

According to this control apparatus, it is possible to produce vaporized fuel during operation of the internal combustion engine, and to store the vaporized fuel in the vaporized fuel tank by utilizing the natural pressure reduction. Due to this, there is no need to produce vaporized fuel at the time of starting the engine, so that the vaporized fuel can be promptly supplied into the cylinders even at the time of cold start.

In addition, when the vaporized fuel is to be produced, the air/fuel ratio in the vaporized fuel tank is estimated. Then, the production of the vaporized fuel is executed until the air/fuel ratio becomes substantially zero. Therefore, according to the invention, the air/fuel ratio in the vaporized fuel tank can be brought substantially to zero, that is, the gas in the tank can be caused to be substantially entirely made up of the vaporized fuel. Therefore, in conjunction with the supply of the vaporized fuel at the time of starting the engine, it is possible to restrain the irregularity in the air/fuel ratio of the internal combustion engine and therefore improve the engine startability and the emission characteristic.

In the foregoing internal combustion engine control apparatus, the estimation device may include a second supply control device that opens the vaporized fuel supply valve for a predetermined period and therefore supplies the vaporized fuel stored in the vaporized fuel tank into the intake passageway, and an amount-of-change calculation device that calculates amount of change that occurs in an air/fuel ratio correction amount from before supply of the vaporized fuel by the second supply control device is executed until after the supply of the vaporized fuel by the second supply control device is executed, and the estimation device may estimate the air/fuel ratio in the vaporized fuel tank based on the amount of change.

According to this control apparatus, when the air/fuel ratio in the vaporized fuel tank is to be estimated, the vaporized fuel supply valve is opened for the predetermined period, and therefore the vaporized fuel in the vaporized fuel tank is supplied into the intake passageway. The amount of change in the air/fuel ratio correction amount between before and after the supply corresponds to the amount of fuel supplied from the vaporized fuel tank. Therefore, according to the invention, the air/fuel ratio in the vaporized fuel tank can be accurately estimated on the basis of the amount of change in the air/fuel ratio correction amount.

In the foregoing internal combustion engine control apparatus, estimation of the air/fuel ratio by the estimation device may be repeatedly executed while the production of the vaporized fuel by the vaporized fuel production device is being executed, and the estimation device may include an opening degree setting device that sets an opening degree of the vaporized fuel supply valve for a case where the supply of the vaporized fuel by the second supply control device is executed, and the opening degree of the vaporized fuel supply valve may be set to a predetermined small opening degree at a first time of executing the estimation of the air/fuel ratio by the estimation device.

According to this control apparatus, the air/fuel ratio in the vaporized fuel tank is repeatedly estimated while the vaporized fuel is being produced. At the first time of estimating the air/fuel ratio, the opening degree of the vaporized fuel supply valve is set to a predetermined small opening degree. Therefore, according to the invention, it is possible to effectively avoid the possibility of the drivability deteriorating due to supply of a large amount of vaporized fuel whose air/fuel ratio is not grasped.

In the foregoing internal combustion engine control apparatus, at second and later times of executing the estimation of the air/fuel ratio, the opening degree setting device may set the opening degree of the vaporized fuel supply valve according to the air/fuel ratio in the vaporized fuel tank estimated previously by the estimation device.

According to this control apparatus, at the second and later times of estimation of the air/fuel ratio, the opening degree of the vaporized fuel supply valve is variably set according to the previously estimated air/fuel ratio of the vaporized fuel. Therefore, according to the invention, it is possible to effectively avoid an event in which the drivability deteriorates due to a rapid change in the air/fuel ratio of the internal combustion engine.

In the foregoing internal combustion engine control apparatus, the estimation device may include a warm-up state determination device that determines a state of warm-up of the internal combustion engine, and a port injection device that, if the state of warm-up is a not-completely-warmed-up state, injects the fuel from the fuel tank into a port of the intake passageway before the vaporized fuel is supplied by the second supply control device.

According to this control apparatus, when the warm-up of the internal combustion engine is not completed, the port injection is performed before the estimation of the air/fuel ratio is executed. Therefore, according to the invention, since port wet can be formed in the intake port prior to estimation of the air/fuel ratio, it is possible to effectively deter the occurrence of an event in which the vaporized fuel supplied at the time of estimation of the air/fuel ratio deposits in the port, and causes an estimation error.

In the foregoing internal combustion engine control apparatus, the port injection device may inject an amount of the fuel that corresponds to an amount of port wet that deposits in the port, according to the state of warm-up.

According to this control apparatus, the amount of fuel corresponding to the amount of port wet in accordance with the state of warm-up of the internal combustion engine is injected into the port. Therefore, according to the invention, it is possible to effectively deter the occurrence of an event in which the vaporized fuel supplied at the time of estimation of the air/fuel ratio deposits in the intake port, and causes an estimation error, while effectively deterring the irregularity in the air/fuel ratio caused by excess fuel injection.

A second aspect of the invention relates to a control method for an internal combustion engine control apparatus. In this control method, the control apparatus includes a fuel tank that stores a fuel, a vaporized fuel tank that is connected to an intermediate portion of an intake passageway of an internal combustion engine and that stores a vaporized fuel that is formed by vaporization of the fuel, an in-tank fuel supply device that supplies the fuel from the fuel tank into the vaporized fuel tank, and a normally-closed vaporized fuel supply valve that opens and closes a connecting portion between the vaporized fuel tank and the intake passageway. The control method includes: estimating air/fuel ratio in the vaporized fuel tank; producing the vaporized fuel in the vaporized fuel tank by driving the in-tank fuel supply device, with the vaporized fuel supply valve closed, until the air/fuel ratio estimated becomes substantially zero, during operation of the internal combustion engine; and supplying the vaporized fuel stored in the vaporized fuel tank into the intake passageway by opening the vaporized fuel supply valve at a time of starting the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described hereinafter with reference to the drawings. Like elements in the drawings are denoted by the same reference characters, and redundant descriptions will be omitted. Besides, the embodiments described below do not limit the invention.

First Embodiment

Construction of First Embodiment

Figure 1:
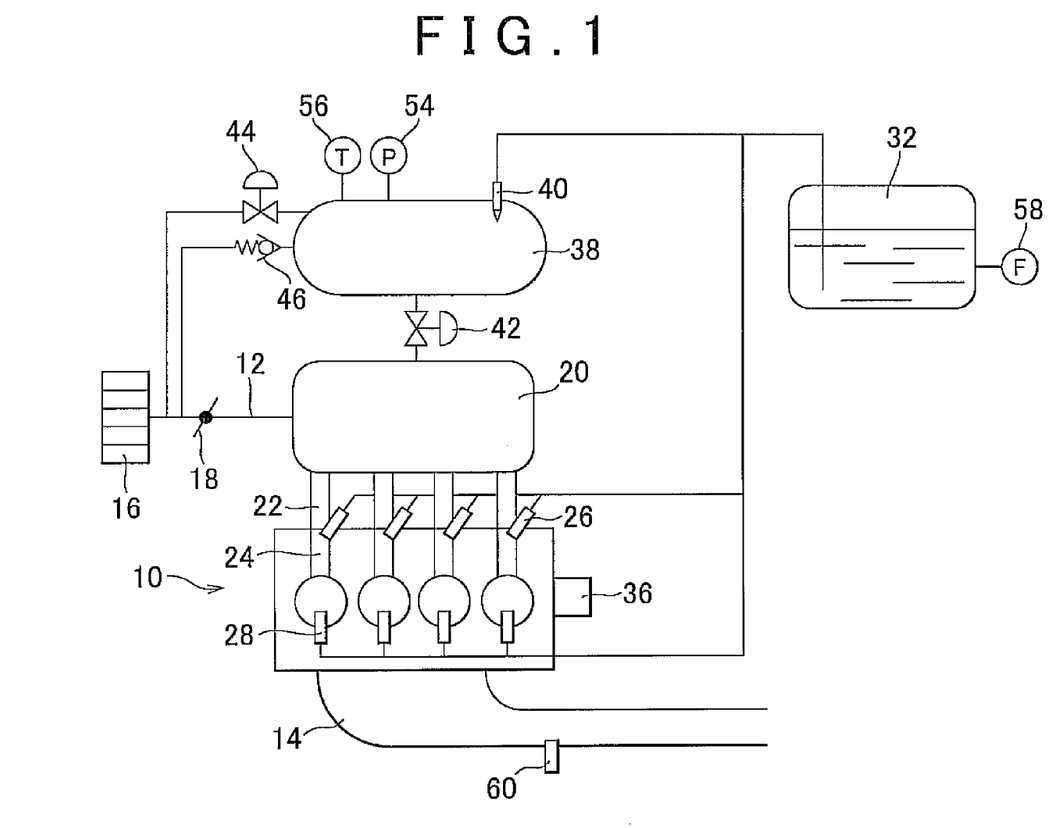
FIG. 1 is an overall construction diagram for describing a system construction of a first embodiment of the invention.

A first embodiment of the invention will be described with reference to FIG. 1 to FIG. 4. FIG. 1 is an overall construction diagram for describing a system construction of the first embodiment of the invention. The system of the invention includes an engine 10 as an internal combustion engine mounted in a FFV (flexible fuel vehicle). Incidentally, although FIG. 1 shows an example of a four-cylinder engine, the invention is not limited to a four-cylinder internal combustion engine. The engine 10 includes an intake passageway 12 that takes intake air into a combustion chamber of each cylinder, and an exhaust passageway 14 into which exhaust gas is discharged from the combustion chambers.

The intake passageway 12 is provided with an air cleaner 16, a throttle valve 18 and a surge tank 20 in that order from an upstream side. The throttle valve 18 is constructed of an electronically controlled butterfly valve, and is opened and closed by an ECU 70 described below. Then, the throttle valve 18 is opened and closed between a fully closed position and a fully open position, and adjusts the amount of intake air that flows through the intake passageway 12 according to the degree of opening of the throttle valve 18. The surge tank 20 forms a space of a certain extent on an intermediate portion of the intake passageway 12, and realizes an effect of damping intake pulsation. A downstream side of the surge tank 20 is connected to an intake port 24 of each cylinder through an intake manifold 22 that is made up of a plurality of intake pipes. Incidentally, the surge tank 20, the intake manifold 22 and the intake ports 24 constitute a portion of the intake passageway 12.

Besides, each cylinder of the engine 10 is provided with an intake port injection valve 26 that injects fuel into the intake port 24, and with an in-cylinder injection valve 28 that injects fuel directly into the combustion chamber (cylinder). These injection valves 26 and 28 are each constructed of a common electromagnetically driven fuel injection valve. Furthermore, each cylinder is provided with an ignition plug 30 (see FIG. 2) that ignites a mixture that flows into the cylinder, and with an intake valve and an exhaust valve (not shown) that open and close the intake port 24 and an exhaust port (not shown) of the cylinder, respectively. The foregoing injection valves 26 and 28 are supplied with alcohol fuel from a fuel tank 32 of the vehicle in which the alcohol fuel is reserved in a liquefied state.

Besides, the engine 10 is equipped with a starter motor 36 that turns a crankshaft at the time of starting the engine 10. When a driver of the vehicle turns on a starter switch, an engine start request is input to an ECU 70. Therefore, the ECU 70 executes an operation (cranking operation) of turning the crankshaft by activating the starter motor 36. Then, at the time point when the engine is started, that is, at the time point when the engine enters a self-sustaining operation, the ECU 70 stops the cranking.

Next, a fuel vaporization system provided for the engine 10 will be described. In this embodiment, vaporized fuel produced during operation of the engine is stored in a tank, and this vaporized fuel is used for the next start of the engine. Then, the fuel vaporization system includes a vaporized fuel tank 38, an in-tank injection valve 40, a vaporized fuel supply valve 42, an atmosphere introduction valve 44, a relief valve 46, etc as described below.

The vaporized fuel tank 38 is a pressure-resistant container having a sealed structure that is constructed so as to store vaporized fuel that is formed by vaporization of the alcohol fuel in the fuel tank 32. Besides, the vaporized fuel tank 38 is disposed, for example, at a position to which heat is likely to be conducted from the engine 10 within an engine compartment. The in-tank injection valve 40 injects (supplies) fuel reserved in the fuel tank 32 into the vaporized fuel tank 38, and constitutes an in-tank fuel supply device in the embodiment. The in-tank injection valve 40 is constructed of, for example, a common fuel injection valve that is the same as or similar to the injection valves 26 and 28, and the amount of fuel injection thereof is controlled according to a control signal. The fuel injected from the in-take injection valve 40 receives heat in the vaporized fuel tank 38 and becomes vaporized fuel.

The vaporized fuel tank 38 is connected to the surge tank 20 at the downstream side of the throttle valve 18. This connecting portion is provided with the vaporized fuel supply valve 42 that is constructed of a normally-closed type electromagnetic valve or the like. When the vaporized fuel supply valve 42 is closed, the vaporized fuel tank 38 and the surge tank 20 are shut off from each other, so that it is possible to store vaporized fuel in the vaporized fuel tank 38. Besides, when the vaporized fuel supply valve 42 is open, the tanks 20 and 38 are interconnected to provide communication therebetween, so that vaporized fuel stored in the vaporized fuel tank 38 is supplied into the surge tank 20.

Besides, the vaporized fuel tank 38 is provided with the atmosphere introduction valve 44 at such a position that the inside of the tank 38 and the outside space can be connected in communication. The atmosphere introduction valve 44 is constructed of a normally-closed electromagnetic valve or the like, and is designed to open the vaporized fuel tank 38 to the atmosphere when the atmospheric introduction valve 44 is opened. When the vaporized fuel is supplied, the vaporized fuel supply valve 42 and the atmosphere introduction valve 44 are open with some time difference therebetween, an amount of atmosphere corresponding to the supply of vaporized fuel is introduced into the vaporized fuel tank 38 from the atmosphere introduction valve 44. Incidentally, these valves 42 and 44 are kept in the closed state except at the time of supplying the vaporized fuel. Besides, the atmosphere introduction valve 44 is connected to the intake passageway 12 between the air cleaner 16 and the throttle valve 18. Therefore, when the atmosphere introduction valve 44 is open, air that is cleaned by the air cleaner 16 and that is not affected by the intake negative pressure is introduced into the vaporized fuel tank 38.

Furthermore, the vaporized fuel tank 38 is provided with a normally-closed relief valve 46 that is constructed of, for example, a check valve, a reed valve, etc. The relief valve 46 releases the pressure in the vaporized fuel tank 38 to the outside (e.g., to the intake passageway 12) when the pressure in the vaporized fuel tank 38 exceeds a predetermined operating pressure. The operating pressure of the relief valve 46 is set at a pressure that is substantially equal to the atmospheric pressure or a pressure that is higher than the atmospheric pressure by about several ten kPa. This setting is made on the precondition that, for example, the vaporized fuel tank 38 is kept at about a normal temperature or slightly higher, and that the saturated vapor pressure of the fuel is a pressure that corresponds to this temperature region. Due to this, the relief valve 46 is constructed so as to let air in the vaporized fuel tank 38 escape to the outside when the fuel injected into the tank 38 vaporizes. Besides, the relief valve 46 also functions as a safety valve that prevents the pressure in the vaporized fuel tank 38 from becoming excessively great during a state in which the tank 38 is sealed.

Figure 2:
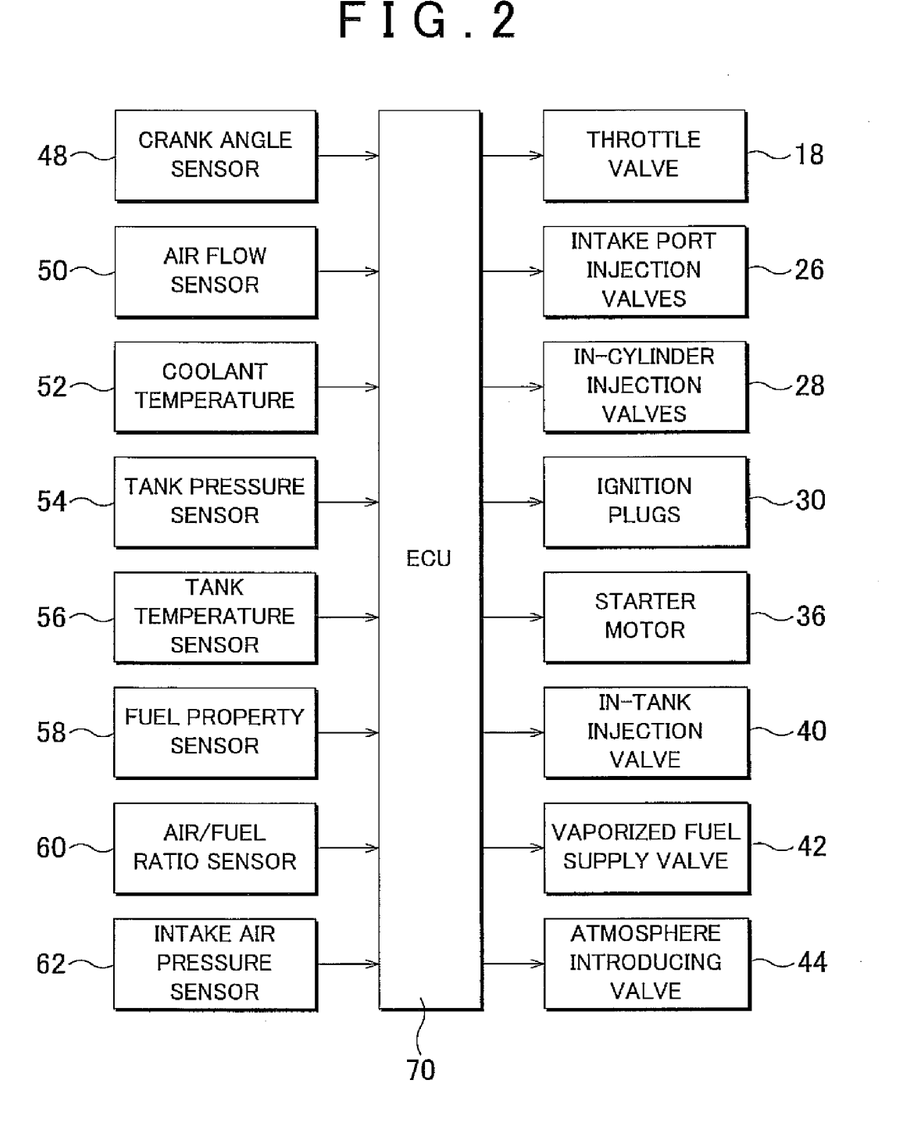
FIG. 2 is a construction diagram showing a control system of the system in the first embodiment of the invention.

Next, with reference to FIG. 2, the control system of the engine 10 will be described. FIG. 2 is a construction diagram showing a control system of the system in the first embodiment of the invention. As shown in FIG. 2, the system of the embodiment includes a sensor system that includes a plurality of sensors described below, and the ECU (electronic control unit) 70 that controls the state of operation of the engine 10.

Firstly, the sensor system will be described. A crank angle sensor 48 outputs a signal that is synchronous with the rotation of the crankshaft of the engine 10. On the basis of the output of the sensor 48, the ECU 70 detects the engine rotation speed and the crank angle. An air flow sensor 50 detects the amount of intake air, and a coolant temperature sensor 52 detects the temperature of a coolant of the engine. An air/fuel ratio sensor 60 is provided at an upstream side of a catalyst that is disposed in the exhaust passageway 14, and detects the exhaust air/fuel ratio of combustion gas discharged from the engine 10. Furthermore, an intake air pressure sensor 62 detects the pressure of intake air, for example, at the position of the surge tank 20. On the basis of the output of the intake air pressure sensor 62, the ECU 70 is able to detect the pressure in the surge tank 20. Besides, a tank pressure sensor 54 detects the pressure in the vaporized fuel tank 38, and a tank temperature sensor 56 detects the temperature in the vaporized fuel tank 38. Besides, a fuel property sensor 58 detects the alcohol concentration in the fuel as a property of the fuel.

Besides the foregoing sensors, the sensor system includes various sensors needed for the control of the vehicle and engines (e.g., a throttle sensor that detects the degree of opening of the throttle valve 18, an accelerator operation amount sensor that detects the acceleration operation amount, etc.). These sensors are connected to an input side of the ECU 70. Incidentally, the invention does not necessarily need the intake air pressure sensor 62. That is, for example, the pressure of intake air may also be estimated on the basis of the amount of air taken into the engine 10, the engine rotation speed, etc., without using the intake air pressure sensor 62. Besides, the tank temperature sensor 56 is not necessarily needed. It is also possible to adopt, for example, a construction in which the in-tank temperature is estimated on the basis of the temperature of the engine 10, the driving history, the characteristic of heat conductivity to the vaporized fuel tank 38, etc.

On the other hand, an output side of the ECU 70 is connected to various actuators, including the throttle valve 18, the injection valves 26, 28 and 40, the ignition plugs 30, the starter motor 36, the vaporized fuel supply valve 42, the atmosphere introduction valve 44, etc. The ECU 70 detects information regarding operation of the engine by using sensor systems, and performs operation control of the engine by driving various actuators on the basis of results of the detection obtained by the sensor systems. Concretely, the ECU 70 detects the engine rotation speed and the crank angle on the basis of output of the crank angle sensor 48, and detects the intake air amount by using the air flow sensor 50. Besides, the ECU 70 performs a feedback control of the air/fuel ratio for controlling the exhaust air/fuel ratio detected by the air/fuel ratio sensor 60 to a control target air/fuel ratio. Furthermore, while executing an ordinary fuel injection control described below, the ECU 70 determines the ignition timing on the basis of the crank angle, and accordingly drives the ignition plugs 30.

The ordinary fuel injection control is executed during operation of the engine 10, except when a vaporized fuel supply control described below is executed. The ordinary fuel injection control includes an engine-start fuel injection control. In this fuel injection control, the ECU 70 calculates the amount of fuel injection on the basis of the intake air amount, the engine rotation speed, the temperature of the engine coolant, etc., and determines the fuel injection timing on the basis of the crank angle. After that, the ECU 70 drives either the intake port injection valves 26 or the in-cylinder injection valves 28 or both the injection valves 26 and the injection valves 28. In this case, the ratio of the amount of fuel injected by the intake port injection valves 26 and the ratio of the amount of fuel injected by the in-cylinder injection valves 28 is variably set according to the state of operation of the engine or the property of the fuel. Furthermore, the ECU 70 executes a vaporized fuel production control and a vaporized fuel supply control (which will be described below) as controls of a fuel vaporization system.

Operations of First Embodiment (Vaporized Fuel Production Control)

The vaporized fuel production control is a control of vaporizing the fuel in the vaporized fuel tank 38 to produce vaporized fuel during operation of the engine 10. Concretely, in the vaporized fuel production control, the fuel is injected from the in-tank injection valve 40 into the vaporized fuel tank 38, with the vaporized fuel supply valve 42 and the atmosphere introduction valve 44 closed. At this time, the amount of fuel injection is determined so that the entire amount of injected fuel vaporizes, on the basis of the temperature in the vaporized fuel tank 38, the alcohol concentration in the fuel, etc. The injected fuel rapidly vaporizes to become vaporized fuel while expelling air from the tank 38 through the relief valve 46. At this time, the relief valve 46 avoids the restraint of vaporization of the fuel being caused by the air pressure in the tank 38, and therefore promotes the production of the vaporized fuel. As a result, when vaporization of the fuel is completed, the air inside the tank 38 is substantially completely discharged, and the inside of the vaporized fuel tank 38 is in a state where the vaporized fuel fills the inside space of the tank 38 at a pressure that is close to the saturated vapor pressure.

Due to the foregoing vaporized fuel production control, the vaporized fuel can be stored in the vaporized fuel tank 38 during operation of the engine 10. Then, the vaporized fuel tank 38 is able to keep at least a portion of the vaporized fuel in a gas phase state by utilizing natural pressure reduction that occurs in the tank 38, even when the engine becomes cold after being stopped. Incidentally, it is preferable that the vaporized fuel production control be executed only in the case where the temperature in the vaporized fuel tank 38 is higher than a predetermined criterion temperature at which the vaporized fuel can be generated.

(Vaporized Fuel Supply Control)

The vaporized fuel supply control is a control of opening the vaporized fuel supply valve 42 and the atmosphere introduction valve 44 and supplying the vaporized fuel stored in the vaporized fuel tank 38 into the surge tank 20 at the time of starting the engine 10. Concretely, firstly the ECU 70 detects occurrence of an engine start request when the starter switch is turned on. Then, the vaporized fuel supply valve 42 and the atmosphere introduction valve 44 are closed, and the throttle valve 18 is kept at the fully closed position. While this state is maintained, the starter motor 36 is electrified to start the cranking. Therefore, the cranking causes intake negative pressure in the surge tank 20.

The ECU 70 opens the vaporized fuel supply valve 42 and the atmosphere introduction valve 44 when the intake negative pressure in the surge tank 20 has sufficiently increased. Therefore, the vaporized fuel in the vaporized fuel tank 38 is supplied into the surge tank 20 by the intake negative pressure. At this time, an amount of air corresponding to the amount of outflow of the vaporized fuel flows into the vaporized fuel tank 38 via the atmosphere introduction valve 44, so that the vaporized fuel is smoothly supplied.

Besides, in the case where the pressure in the vaporized fuel tank 38 is higher than or equal to the atmospheric pressure when the atmosphere 44 is to be opened, the vaporized fuel supply valve 42 is firstly opened and, after that, the atmosphere introduction valve 44 is opened. On the other hand, in the case where the pressure in the tank 38 is lower than the atmospheric pressure, the atmosphere introduction valve 44 is firstly opened, and then the vaporized fuel supply valve 42 is opened. This effectively prevents the vaporized fuel in the tank 38 from flowing out into the atmosphere, and effectively prevents reverse flow of air from the surge tank 20 into the vaporized fuel tank 38.

The vaporized fuel supplied from the vaporized fuel tank 38 into the surge tank 20 flows into the cylinders through the intake ports 24, and is ignited to burn in the cylinders. As the combustion in the cylinders successively occurs, the engine rotation speed increases, so that the engine transitions into the self-sustaining operation. The ECU 70 stops the cranking at the time point of confirming the start of the self-sustaining operation by increase in the engine rotation speed. Besides, the ECU 70 closes the vaporized fuel supply valve 42 and the atmosphere introduction valve 44, and then ends the vaporized fuel supply control. Then, the ECU 70 starts the ordinary fuel injection control of injecting fuel from the intake port injection valves 26 and/or the in-cylinder injection valves 28.

Thus, if the vaporized fuel stored during operation of the engine is used to start the engine as described above, it is possible to promptly supply vaporized fuel into the cylinders and therefore improve engine startability even at the time of low-temperature engine start at which the fuel less readily vaporizes, in comparison with the case where vaporized fuel is produced at the time of starting the engine. Incidentally, it is preferable that the vaporized fuel supply control be executed only when the engine temperature (e.g., the engine coolant temperature, or the like) at the time of starting the engine is lower than or equal to a predetermined criterion temperature at or below which the vaporized fuel is needed.

Features of the Embodiment

By the way, in order to supply a necessary amount of fuel at the time of the foregoing vaporized fuel supply control, it is necessary to grasp the air/fuel ratio of a mixture of the vaporized fuel and remaining air in the fuel tank 38 (hereinafter, referred to as "in-tank mixture"). Therefore, in the system of this embodiment, the production of vaporized fuel is executed until the air/fuel ratio of the in-tank mixture becomes substantially zero. Since this makes the in-tank mixture contain only the vaporized fuel, it is possible to accurately grasp the amount of vaporized fuel that is subsequently supplied into the vaporized fuel supply control that is performed at the time of starting the engine. Therefore, it is possible to effectively restrain occurrence of an event in which engine startability deterioration or emission quality deterioration occurs due to irregularity in the air/fuel ratio at the time of starting the engine.

Incidentally, it is preferable that whether or not the air/fuel ratio of the in-tank mixture has become substantially zero be determined by estimating the air/fuel ratio of the in-tank mixture as the need arises during execution of the vaporized fuel production control. More concretely, firstly the vaporized fuel supply valve 42 is opened for a predetermined period during execution of the vaporized fuel production control, when the engine is in a predetermined steady operation. Therefore, a portion of the in-tank mixture is supplied into the surge tank 20 by the intake negative pressure in the surge tank 20. Incidentally, the amount of in-tank mixture supplied can be calculated from a flow path area found from the degree of opening of the vaporized fuel supply valve 42, the duration of an open state of the vaporized fuel supply valve 42, and a differential pressure between the vaporized fuel tank 38 and the surge tank 20 that is calculated through the use detection signals from the intake pressure sensor 62 and the tank pressure sensor 20.

The vaporized fuel in the supplied in-tank mixture burns in the cylinders with the fuel injected from the intake port injection valves 26 or the in-cylinder injection valves 28. It is to be noted herein that the ECU 70 executes the air/fuel ratio feedback control during operation of the engine 10 as described above. Therefore, when the in-cylinder fuel amount increases due to the foregoing supply of the in-tank mixture, the feedback correction amount changes so as to correct the deviation of the air/fuel ratio caused by the increase. That is, the amount of change in the feedback correction amount between before and after the supply of the in-tank mixture changes in correspondence to the amount of vaporized fuel in the mixture supplied. Therefore, if map data in which the amount of change in the feedback correction amount and the supplied amount of in-tank mixture are associated with the air/fuel ratio of the in-tank mixture is stored in the ECU 70, the air/fuel ratio of the mixture corresponding to the amount of change in the feedback correction amount and the supplied amount of in-tank mixture can be calculated.

Concrete Process of First Embodiment

Figure 3:
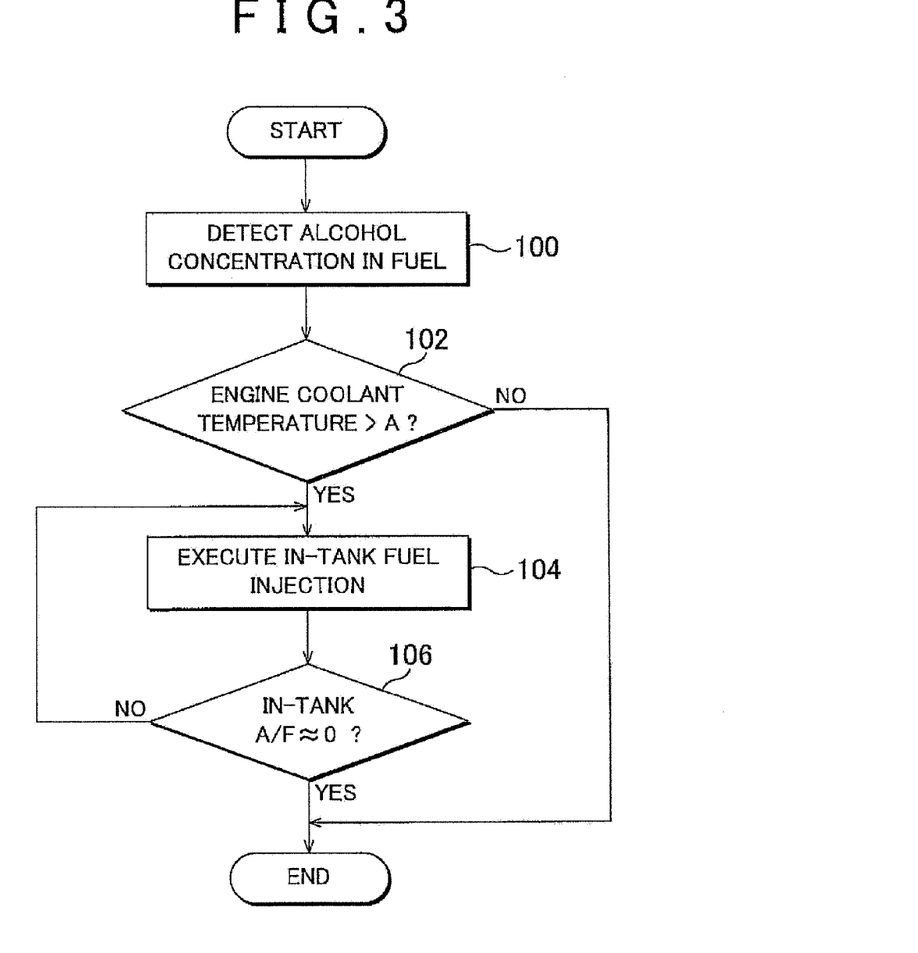
FIG. 3 is a flowchart showing a routine that is executed in the first embodiment of the invention.

Next, concrete processes for realizing the foregoing controls will be described with reference to FIG. 3 and FIG. 4. FIG. 3 is a flowchart showing a vaporized fuel production control that is executed by the ECU 70 in the first embodiment of the invention. The routine shown in FIG. 3 is repeatedly executed during operation of the engine 10.

In the routine shown in FIG. 3, firstly the alcohol concentration E in the fuel in the fuel tank 32 is detected by using the fuel property sensor 58 (step 100). Next, it is determined whether or not the engine coolant temperature detected by using the engine coolant temperature sensor 52 is higher than a criterion temperature A (step 102). The criterion temperature A is set corresponding to a lower-limit value of temperature that allows production of vaporized fuel in the vaporized fuel tank 38, and is a criterion temperature for permitting the fuel injection to be performed in the tank. If the determination in step 102 is affirmative, it is determined that the temperature is such that the fuel readily evaporates. The process proceeds to the next step, in which fuel is injected into the vaporized fuel tank 38 (step 104). Concretely, in this step, with the vaporized fuel supply valve 42 and the atmosphere introduction valve 44 closed, the in-tank injection valve 40 is driven so that the vaporized fuel is stored into the vaporized fuel tank 38.

Next, it is determined whether or not the air/fuel ratio (A/F) of the in-tank mixture has become substantially zero (step 106). The air/fuel ratio of the in-tank mixture is estimated by a sub-routine shown in FIG. 4 (described below). If, as a result, the establishment of A/F≈0 is not observed, the process returns to step 104, in which fuel is injected into the vaporized fuel tank 38 again. On the other hand, if the establishment of A/F≈0 is observed in step 106, it is determined that the vaporized fuel tank 38 is substantially filled with the vaporized fuel, and the routine ends.

Figure 4:
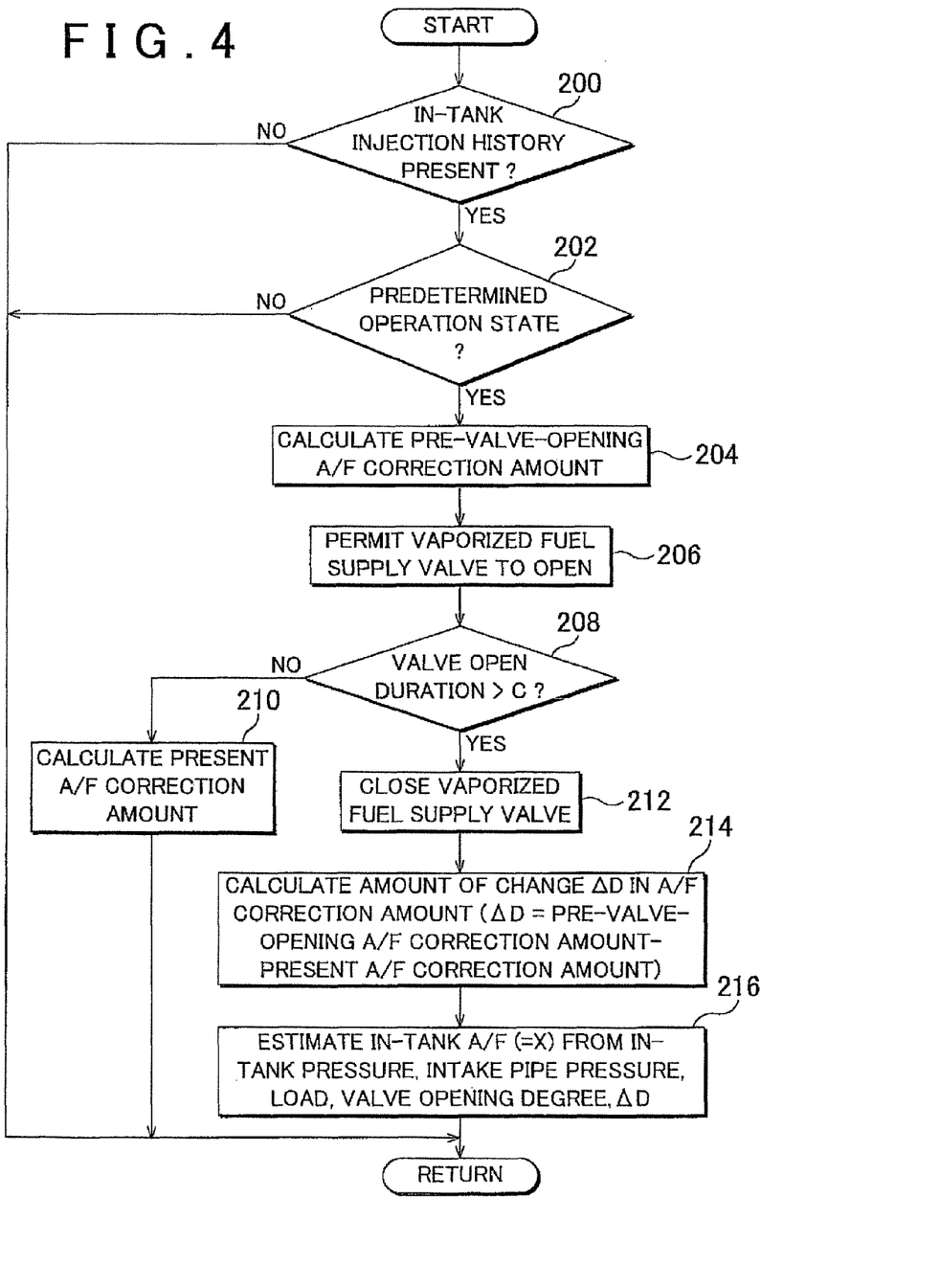
FIG. 4 is a flowchart showing another routine that is executed in the first embodiment of the invention.

FIG. 4 is a flowchart of a sub-routine of estimating the air/fuel ratio of the in-tank mixture which is executed by the ECU 70 in the first embodiment of the invention. The routine shown in FIG. 4 is repeatedly executed during operation of the engine 10.

In the routine shown in FIG. 4, it is firstly determined whether or not there is a history of fuel injection into the vaporized fuel tank 38 (step 200). Concretely in this step, it is determined whether or not the process of step 104 has been executed during the present trip of the vehicle. If a result of the determination is that there is no history of fuel injection, it is determined that vaporized fuel has not been stored in the vaporized fuel tank 38, and the routine promptly ends.

On the other hand, if in step 200 it is determined that there is a history of fuel injection, the process proceeds to the next step, in which it is determined whether or not the engine operation state (the rotation speed and the load factor) is a predetermined steady operation state and it is determined whether or not it is presently possible to supply the vaporized fuel in the vaporized fuel tank 38 into the surge tank 20 (whether or not there is a predetermined intake pipe negative pressure) (step 202). If a result is that the establishment of these conditions is not observed, it is determined that the action of estimating the air/fuel ratio cannot be executed, and the routine promptly ends.

On the other hand, if in step 202 it is observed that the conditions have been established, it is determined that the action of estimating the air/fuel ratio can be executed. Then the process proceeds to the next step, in which a correction amount for the air/fuel ratio feedback control at the present time point is calculated (step 204). Next, the opening of the vaporized fuel supply valve 42 is permitted (step 206). Due to this, the vaporized fuel supply valve 42 is opened to a predetermined fixed degree of opening, and a portion of the in-tank mixture in the vaporized fuel tank 38 flows into the surge tank 20.

Next, it is determined whether or not the valve open duration of the vaporized fuel supply valve 42 has exceeded a predetermined time C (step 208). The predetermined time C is a time that is needed in order for a predetermined amount of in-tank mixture to be supplied into the surge tank 20, a preset value of the time is read in. If a result is that the establishment of the valve open duration>the predetermined time C is not observed, the correction amount for the air/fuel ratio feedback control at the present time point is calculated (step 210), and the routine temporarily ends. On the other hand, if in step 208 the establishment of the valve open duration>the predetermined time C is observed, the process proceeds to the next step, in which the vaporized fuel supply valve 42 is closed (step 212).

Next, the amount of change ΔD of the air/fuel ratio feedback correction amount is calculated (step 214). Concretely in this step, the amount of change ΔD is calculated by subtracting the feedback correction amount that is used immediately prior to the closure of the vaporized fuel supply valve 42 which is calculated in step 210 from the feedback correction amount used prior to the opening of the vaporized fuel supply valve 42 which is calculated in step 204.

Next, the air/fuel ratio of the in-tank mixture is estimated (step 216). Concretely in this step, firstly the amount of in-tank mixture supplied to the surge tank 20 is calculated on the basis of the differential pressure between the pressure in the surge tank 20 found from the detection signal from the intake air pressure sensor 62 and the pressure in the vaporized fuel tank 38 found from the detection signal from the tank pressure sensor 54, the flow path area found from the degree of opening of the vaporized fuel supply valve 42, and the valve open duration (predetermined time C) of the vaporized fuel supply valve 42. Then, using the map data mentioned above, the air/fuel ratio of the in-tank mixture corresponding to the amount of supplied in-tank mixture and the amount of change ΔD in the air/fuel ratio feedback correction amount is calculated.

As described above, according to the system of this embodiment, the vaporized fuel production control is executed until the air/fuel ratio of the in-tank mixture becomes substantially zero. Therefore, in the vaporized fuel supply control at the time of the next time of starting the engine, it is possible to highly accurately grasp the amount of vaporized fuel supplied into the surge tank 20. This restrains the irregularity of air/fuel ratio at the time of supplying the vaporized fuel, so that the deterioration of the engine startability and the deterioration of emission quality can be effectively deterred.

By the way, although the foregoing system of the first embodiment uses the engine coolant temperature in the determination for permitting the fuel injection in the tank during the vaporized fuel production control, it is also permissible to use, for the determination, the temperature in the vaporized fuel tank 38 which is detected by the tank temperature sensor 56.

Besides, although the pressure in the surge tank 20 is obtained on the basis of the detection signal from the intake air pressure sensor 62, the pressure in the surge tank 20 may instead be estimated on the basis of the engine rotation speed and the load factor.

Besides, the system of the first embodiment is described above by taking, for example, the engine 10 that uses alcohol fuel. However, the invention is not limited so, but may also be applied to various kinds of fuels such as an ordinary gasoline, a mixture of gasoline with a component other than alcohol.

Incidentally, in the foregoing first embodiment, the in-tank injection valve 40 functions as an "in-tank fuel supply device" in the invention. In the first embodiment, the ECU 70 executing the process of step 104 performs a function as a "vaporized fuel production device" in the invention. In the first embodiment, the ECU 70 executing the process of step 106 performs a function as an "estimation device" and a "supply control device" in the invention.

Besides, in the foregoing first embodiment, the ECU 70 executing the process of step 216 performs a function as the "estimation device" in the invention. In the first embodiment, the ECU 70 executing the process of step 206 performs a function as a "second supply control device" in the invention. In the first embodiment, the ECU 70 executing the process of step 214 performs a function as an "amount-of-change calculation device" in the invention.

Second Embodiment

Features of Second Embodiment

Next, a second embodiment of the invention will be described with reference to FIG. 5. A system of this embodiment can be realized by causing the ECU 70 to execute a routine shown in FIG. 5 while using the hardware construction shown in FIG. 1 and the control construction shown in FIG. 2.

In the foregoing system of the first embodiment, if a permission to open the vaporized fuel supply valve 42 is output in the control of estimating the air/fuel ratio of the in-tank mixture, the vaporized fuel supply valve 42 is opened to the predetermined fixed degree of opening. Therefore, in the case where the air/fuel ratio of the in-tank mixture is excessively rich or lean, there is a capable of decline in the drivability due to irregular values of the air/fuel ratio. Therefore, it is conceivable to set a degree of opening of the vaporized fuel supply valve 42 according to the air/fuel ratio of the in-tank mixture. However, for example, when the air/fuel ratio is estimated for the first time in each trip of the vehicle, the air/fuel ratio of the in-tank mixture is unknown, so that the degree of opening cannot be set according to the size of the air/fuel ratio.

Therefore, in the system of the second embodiment, at the first time of estimating the air/fuel ratio in each trip of the vehicle, the opening degree of the vaporized fuel supply valve 42 is set to a predetermined small opening degree (i.e., at the first time of estimating the air/fuel ratio in each trip of the vehicle, the opening degree of the vaporized fuel supply valve 42 is set so as to be small than or equal to a predetermined opening degree and so that it is possible to effectively avoid the possibility of the drivability deteriorating due to supply of a large amount of vaporized fuel whose air/fuel ratio is not grasped). More concretely, for example, the vaporized fuel supply valve 42 is preferably set to an opening degree B such that the amount of supplied in-tank mixture makes up A% of the entire amount of mixture. Incidentally, the proportion of A% is preferably a mixture proportion such that the air/fuel ratio of the mixture does not become greater than or equal to a lean-limit air/fuel ratio nor less than or equal to a rich-limit air/fuel ratio even when the air/fuel ratio of the in-tank mixture is an excess rich state or an excess lean state. Due to this, even when the air/fuel ratio of the in-tank mixture is not known, the occurrence of irregular air/fuel ratio can be effectively restrained.

However, if the amount of vaporized fuel supplied is small, the accuracy in the estimation of the air/fuel ratio declines. Therefore, if there is no concern of irregular air/fuel ratio, it is preferable that the opening degree of the vaporized fuel supply valve 42 be as large as possible. Therefore, in the system of the second embodiment, at the second and later times of estimating the air/fuel ratio, the opening degree of the vaporized fuel supply valve 42 is variably set according to the air/fuel ratio estimated in the previous process of air/fuel ratio estimation.

More concretely, firstly it is determined whether or not the estimated air/fuel ratio is in a predetermined range of air/fuel ratio. Incidentally, it is preferable that the predetermined range of air/fuel ratio be a range such that the air/fuel ratio of mixture does not become greater than or equal to the lean-limit air/fuel ratio nor less than or equal to the rich-limit air/fuel ratio, even when the proportion of the in-tank mixture supplied exceeds A% in the present engine operation region.

If the estimated air/fuel ratio is in the predetermined range of air/fuel ratio, the opening degree of the vaporized fuel supply valve 42 is set to an opening degree such that the amount of in-tank mixture supplied is D% (>A%) of the entire amount of mixture. Incidentally, the proportion of D% is a value that changes according to the estimated air/fuel ratio, and is preferably set to a mixture proportion that corresponds to such a maximum amount of supply that the air/fuel ratio of mixture does not become greater than or equal to the lean-limit air/fuel ratio nor less than or equal to the rich-limit air/fuel ratio, if the in-tank mixture whose air/fuel ratio is the estimated air/fuel ratio is supplied in the present operation region. Due to this, it is possible to improve the accuracy of estimation of the air/fuel ratio while deterring irregularity of the air/fuel ratio.

Concrete Process of Second Embodiment

A concrete process for realizing the foregoing controls will be described with reference to FIG. 5. FIG. 5 is a flowchart showing a sub-routine that is executed in order to set the opening degree of the vaporized fuel supply valve 42 in step 206 of the foregoing routine shown in FIG. 4.

Figure 5:
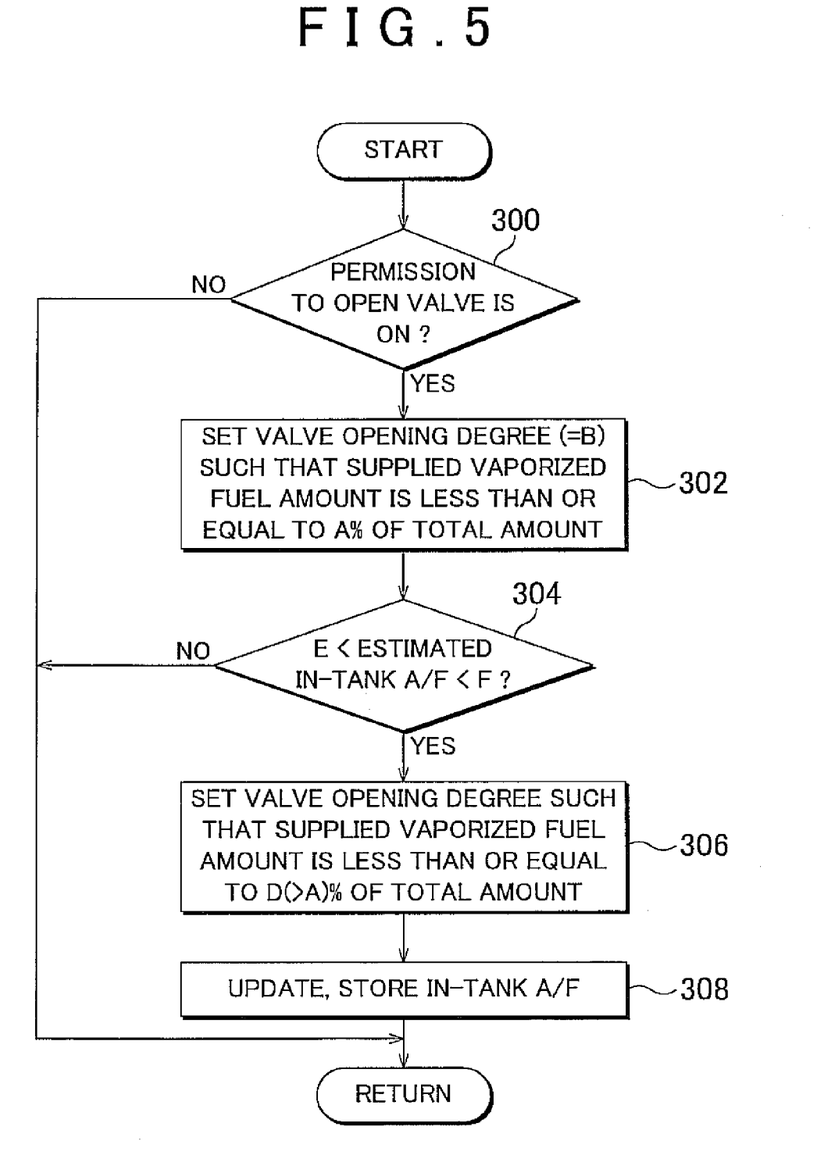
FIG. 5 is a flowchart showing a routine that is executed in a second embodiment of the invention.

In the routine shown in FIG. 5, it is determined whether or not the permission to open the valve has become on (step 300). If the determination is affirmative, the process proceeds to the next step, in which a first-time opening degree of the vaporized fuel supply valve 42 is set (step 302). Concretely, such an opening degree B of the vaporized fuel supply valve 42 that the amount of in-tank mixture makes up A% of the entire amount of mixture is calculated and set on the basis of the operation state of the engine, such as the engine rotation speed, the load factor, the intake pipe pressure, the pressure in the vaporized fuel tank 38, the pressure (intake air pressure) in the surge tank 20, etc.

Next, it is determined whether or not the estimated air/fuel ratio of the in-tank mixture is in the predetermined range of air/fuel ratio (E<the estimated air/fuel ratio<F) (step 304). Concretely in this step, the air/fuel ratio of the in-tank mixture that is stored in step 308 (described below) is read in, and it is determined whether or not the air/fuel ratio is in a predetermined range of air/fuel ratio which has a maximum air/fuel ratio and a minimum air/fuel ratio that correspond to the lean limit and the rich limit, respectively. If the determination is negative, or if the air/fuel ratio of the in-tank mixture has not been estimated (the valve is opened for the first time), it is determined that there is possibility of the lean limit or the rich limit being exceeded if the amount of in-tank mixture supplied is increased above A%, and the routine ends.

On the other hand, if in step 304 the determination is affirmative, it is determined that it is possible to increase the amount of supplied in-tank mixture to an amount that is greater than A%. Then the process proceeds to the next step, in which such an opening degree of the vaporized fuel supply valve 42 that the amount of supplied in-tank mixture makes up D% (>A%) of the entire amount of mixture is calculated and set (step 306). Concretely in this step, such a maximum amount of supplied in-tank mixture that neither the lean limit nor the rich limit is exceeded is calculated on the basis of the estimated air/fuel ratio of the in-tank mixture, and an opening degree of the vaporized fuel supply valve 42 that corresponds to the maximum amount of supplied in-tank mixture is calculated and set. Next, the air/fuel ratio of the in-tank mixture is updated to a value that is newly estimated in step 216, and is stored (step S308).

As described above, according to the system of this embodiment, at the first time of opening the vaporized fuel supply valve 42, the opening degree of the vaporized fuel supply valve 42 is set to a predetermined small opening degree (=B). Due to this, even when the air/fuel ratio of the in-tank mixture is not known, the occurrence of irregular air/fuel ratios can be effectively restrained.

Besides, according to the system of the embodiment, at the second and later times of opening the vaporized fuel supply valve 42, the opening degree of the vaporized fuel supply valve 42 is set to an opening degree that is commensurate with the in-tank air/fuel ratio. Due to this, it is possible to improve the accuracy of estimation of the air/fuel ratio while deterring irregularity in the air/fuel ratio.

Incidentally, in the foregoing second embodiment, the valve opening degree B functions as a predetermined small opening degree in the invention. In the second embodiment, the ECU 70 executing the process of step 302 performs a function as an "opening degree setting device" in the invention. In the second embodiment, the ECU 70 executing the process of step 306 performs a function as the "opening degree setting device" in the invention.

Third Embodiment

Features of Third Embodiment

A third embodiment of the invention will be described with reference to FIG. 6. A system of this embodiment can be realized by causing the ECU 70 to execute a routine (described below) shown in FIG. 6 while using the hardware construction shown in FIG. 1 and the control construction shown in FIG. 2.

In the foregoing system of the first embodiment, fuel is injected into the vaporized fuel tank 38 in the case where during the vaporized fuel production control, the engine coolant temperature has reached such a temperature that vaporized fuel can be produced in the vaporized fuel tank 38 (the criterion temperature A).

However, depending on the engine operation state, the engine coolant temperature does not necessarily reach the criterion temperature A during a given trip, that is, a case where the engine is stopped in a half warmed-up state can be expected or assumed. Therefore, depending on the engine operation situation, a case where the vaporized fuel production control is executed prior to the transition to the completely warmed-up state can be assumed. In this case, it is necessary to perform the estimation of the air/fuel ratio of the in-tank mixture in the half warmed-up state. However, since in the half warmed-up state, the supplied vaporized fuel deposits on wall surfaces of the intake ports 24 as port wet, there is possibility of decline of the accuracy of air/fuel ratio estimation.

Therefore, in the system of the embodiment, when the control of estimating the air/fuel ratio of in-tank mixture during the half warmed-up state of the engine is to be executed, port wet is formed beforehand in the intake ports 24. More concretely, the amount of fuel corresponding to the amount of port wet is calculated on the basis of the engine coolant temperature, and the fuel injection from the intake port injection valves 26 is executed before the vaporized fuel supply valve 42 is opened. The injected fuel deposits as port wet on the wall surfaces of the intake ports 24. Due to this, when the vaporized fuel supply valve 42 is subsequently opened, the vaporized fuel in the in-tank mixture is deterred from depositing on the wall surfaces of the intake ports 24, so that it is possible to effectively avoid an event in which the accuracy of estimation of the air/fuel ratio declines.

Concrete Processes of Third Embodiment

Next, concrete processes for realizing the foregoing control will be described with reference to FIG. 6. Firstly, FIG. 6 is a flowchart showing a sub-routine that is executed when a permission to open the vaporized fuel supply valve 42 is output in step 206 in the foregoing routine shown in FIG. 4.

Figure 6:
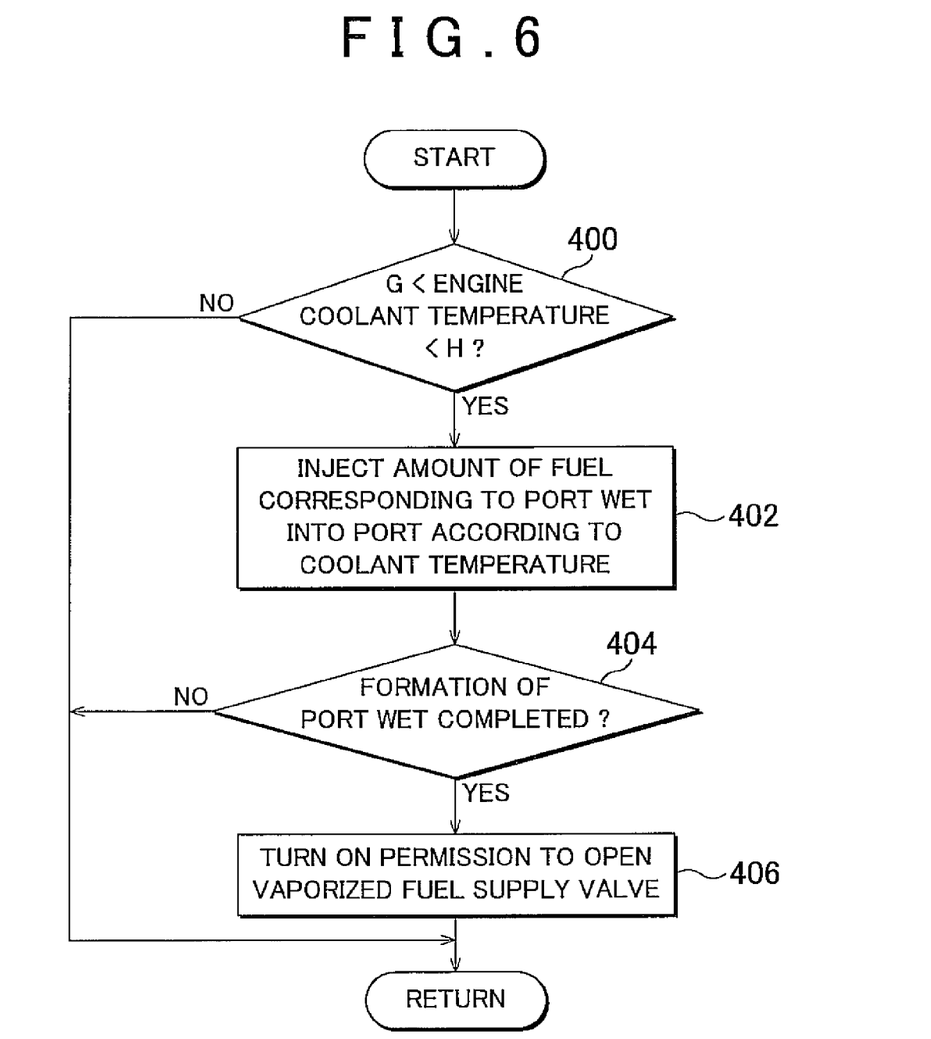
FIG. 6 is a flowchart showing a routine that is executed by a third embodiment of the invention.

In the routine shown in FIG. 6, firstly it is determined whether or not the warm-up state of the engine is a predetermined half warmed-up state (step 400). Concretely in this step, it is determined whether or not the engine coolant temperature calculated from the detection signal from the coolant temperature sensor 52 is in a predetermined half warmed-up temperature range. As the predetermined half warmed-up temperature range, it is possible to use values of temperature that are set beforehand as a temperature range in which vaporized fuel can be produced in the vaporized fuel tank 38 before the engine is completely warmed up.

Next, the amount of fuel for the port wet is calculated on the basis of the engine coolant temperature calculated in step 400, and the fuel injection from the intake port fuel injection valves 26 is accordingly executed (step 402). Next, it is determined whether or not the formation of port wet has been completed (step 404). If an affirmative determination results, the permission to open the vaporized fuel supply valve 42 is turned on (step 406).

As described above, according to the system of this embodiment, in the case where the estimation of the air/fuel ratio of the in-tank mixture is executed during the half warmed-up state of the engine, port wet is formed beforehand on wall surfaces of the intake ports 24. This deters the vaporized fuel contained in the in-tank mixture from depositing on the wall surfaces of the intake ports 24, so that even during the half warmed-up state of the engine, high accuracy of estimation of the air/fuel ratio can be maintained.

Incidentally, in the third embodiment, the ECU 70 executing the process of step 400 performs a function as a "warm-up state determination device" in the invention. In the third embodiment, the ECU 70 executing the process of step 402 performs a function as a "port injection device" in the invention.

What is claimed is:

1. An internal combustion engine control apparatus comprising:
   a fuel tank that stores a fuel;
   a vaporized fuel tank that is connected to an intermediate portion of an intake passageway of an internal combustion engine and that stores a vaporized fuel that is formed by vaporization of the fuel;
   an in-tank fuel supply device that supplies the fuel from the fuel tank into the vaporized fuel tank;
   a normally-closed vaporized fuel supply valve that opens and closes a connecting portion between the vaporized fuel tank and the intake passageway;
   a vaporized fuel production device that drives the in-tank fuel supply device while the vaporized fuel supply valve is closed during operation of the internal combustion engine, and that therefore produces the vaporized fuel in the vaporized fuel tank;
   an estimation device that estimates air/fuel ratio in the vaporized fuel tank;
   a production control device that executes production of the vaporized fuel by the vaporized fuel production device until the air/fuel ratio in the vaporized fuel tank estimated by the estimation device becomes substantially zero; and
   a supply control device that opens the vaporized fuel supply valve at a time of starting the internal combustion engine, and therefore supplies the vaporized fuel stored in the vaporized fuel tank into the intake passageway.

2. The internal combustion engine control apparatus according to claim 1, wherein:
   the estimation device includes a second supply control device that opens the vaporized fuel supply valve for a predetermined period and therefore supplies the vaporized fuel stored in the vaporized fuel tank into the intake passageway, and an amount-of-change calculation device that calculates amount of change that occurs in an air/fuel ratio correction amount from before supply of the vaporized fuel by the second supply control device is executed until after the supply of the vaporized fuel by the second supply control device is executed; and the estimation device estimates the air/fuel ratio in the vaporized fuel tank based on the amount of change.

3. The internal combustion engine control apparatus according to claim 2, wherein
the air/fuel ratio correction amount is a feedback correction amount for use for a feedback control of the air/fuel ratio of the internal combustion engine during the operation of the internal combustion engine.

4. The internal combustion engine control apparatus according to claim 2, wherein:
estimation of the air/fuel ratio by the estimation device is repeatedly executed while the production of the vaporized fuel by the vaporized fuel production device is being executed;
the estimation device includes an opening degree setting device that sets an opening degree of the vaporized fuel supply valve for a case where the supply of the vaporized fuel by the second supply control device is executed; and
the opening degree of the vaporized fuel supply valve is set to a predetermined small opening degree at a first time of executing the estimation of the air/fuel ratio by the estimation device.

5. The internal combustion engine control apparatus according to claim 4, wherein
at second and later times of executing the estimation of the air/fuel ratio, the opening degree setting device sets the opening degree of the vaporized fuel supply valve according to the air/fuel ratio in the vaporized fuel tank estimated previously by the estimation device.

6. The internal combustion engine control apparatus according to claim 2, wherein
the estimation device includes a warm-up state determination device that determines a state of warm-up of the internal combustion engine, and a port injection device that, if the state of warm-up is a not-completely-warmed-up state, injects the fuel from the fuel tank into a port of the intake passageway before the vaporized fuel is supplied by the second supply control device.

7. The internal combustion engine control apparatus according to claim 6, wherein
the port injection device injects an amount of the fuel that corresponds to an amount of port wet that deposits in the port, according to the state of warm-up.

8. A control method for an internal combustion engine control apparatus, wherein
the control apparatus includes a fuel tank that stores a fuel, a vaporized fuel tank that is connected to an intermediate portion of an intake passageway of an internal combustion engine and that stores a vaporized fuel that is formed by vaporization of the fuel, an in-tank fuel supply device that supplies the fuel from the fuel tank into the vaporized fuel tank, and a normally-closed vaporized fuel supply valve that opens and closes a connecting portion between the vaporized fuel tank and the intake passageway,
the control method comprising:
estimating air/fuel ratio in the vaporized fuel tank;
producing the vaporized fuel in the vaporized fuel tank by driving the in-tank fuel supply device, with the vaporized fuel supply valve closed, until the air/fuel ratio estimated becomes substantially zero, during operation of the internal combustion engine; and
supplying the vaporized fuel stored in the vaporized fuel tank into the intake passageway by opening the vaporized fuel supply valve at a time of starting the internal combustion engine.

9. The control method according to claim 8, further comprising
calculates amount of change that occurs in an air/fuel ratio correction amount from before opening the vaporized fuel supply valve for a predetermined period and therefore supplying the vaporized fuel stored in the vaporized fuel tank into the intake passageway until after the vaporized fuel is supplied into the intake passageway,
wherein the air/fuel ratio in the vaporized fuel tank is estimated based on the amount of change.

10. The control method according to claim 9, wherein
the air/fuel ratio correction amount is a feedback correction amount for use for a feedback control of the air/fuel ratio of the internal combustion engine during the operation of the internal combustion engine.

11. The control method according to claim 9, further comprising
setting an opening degree of the vaporized fuel supply valve for a case where the vaporized fuel stored in the vaporized fuel tank is supplied into the intake passageway by opening the vaporized fuel supply valve for the predetermined period,
wherein estimation of the air/fuel ratio is repeatedly executed while production of the vaporized fuel is being executed, and
wherein the opening degree of the vaporized fuel supply valve is set to a predetermined small opening degree at a first time of executing the estimation of the air/fuel ratio.

12. The control method according to claim 11, wherein
at second and later times of executing the estimation of the air/fuel ratio, the opening degree of the vaporized fuel supply valve is set according to the air/fuel ratio in the vaporized fuel tank that is previously estimated.

13. The control method according to claim 9, further comprising:
determining a state of warm-up of the internal combustion engine; and
injecting, if the state of warm-up is a not-completely-warmed-up state, the fuel stored in the fuel tank into a port of the intake passageway before the vaporized fuel is supplied from the vaporized fuel tank into the intake passageway by opening the vaporized fuel supply valve for the predetermined period.

14. The control method according to claim 13, wherein
if the state of warm-up is a not-completely-warmed-up state, in injection into the port, an amount of the fuel that corresponds to an amount of port wet that deposits in the port is injected according to the state of warm-up.

* * * * *